(12) United States Patent
Gaast et al.

(10) Patent No.: US 7,653,019 B2
(45) Date of Patent: Jan. 26, 2010

(54) METHOD OF DISTRIBUTING IDENTICAL DATA TO MOBILE UNITS

(75) Inventors: Tjietse Van Der Gaast, Huizen (NL); Geert Jan Hoekstra, Amersfoort (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 379 days.

(21) Appl. No.: 11/461,054

(22) Filed: Jul. 31, 2006

(65) Prior Publication Data

US 2008/0026777 A1    Jan. 31, 2008

(51) Int. Cl.
*H04Q 7/00* (2006.01)
(52) U.S. Cl. .................. 370/312; 370/390; 370/432; 455/466
(58) Field of Classification Search .......... 455/466, 455/414.1, 59, 60, 61, 70, 72; 370/312, 349, 370/389, 390, 432, 471, 473–475
See application file for complete search history.

(56) References Cited

U.S. PATENT DOCUMENTS

| 6,963,925 | B1 * | 11/2005 | Ishikawa et al. ............. 709/238 |
| 7,113,512 | B1 * | 9/2006 | Holmgren et al. ........ 370/395.53 |
| 7,133,404 | B1 * | 11/2006 | Alkhatib et al. ............. 370/392 |
| 7,277,442 | B1 * | 10/2007 | Holmgren et al. ........ 370/395.53 |
| 2003/0112778 | A1 | 6/2003 | Lundby ........................ 370/335 |
| 2003/0210710 | A1 | 11/2003 | Odman ........................ 370/471 |
| 2006/0143277 | A1 * | 6/2006 | Bauchot et al. ............. 709/206 |
| 2007/0112962 | A1 * | 5/2007 | Lewontin .................... 709/227 |
| 2008/0280618 | A1 * | 11/2008 | Gaast et al. ................. 455/445 |

FOREIGN PATENT DOCUMENTS

| GB | 2 398 207 A | 8/2004 |
| WO | WO 2004/109974 A1 | 12/2004 |
| WO | WO 2005/025122 A1 | 3/2005 |

OTHER PUBLICATIONS

International Search Report and Written Opinion mailed Dec. 27, 2007.

* cited by examiner

*Primary Examiner*—CongVan Tran
(74) *Attorney, Agent, or Firm*—Williams, Morgan & Amerson, P.C.

(57) ABSTRACT

The present invention provides a method for distributing identical data to mobile units. The method includes providing a plurality of first messages including information indicative of a pseudo-address and a corresponding one of a plurality of mobile unit addresses. The method also includes providing at least one second message including the pseudo-address and a portion of a payload of a packet destined for a plurality of mobile units indicated by the plurality of mobile unit addresses.

17 Claims, 5 Drawing Sheets

METHOD OF DISTRIBUTING IDENTICAL DATA TO MOBILE UNITS

BACKGROUND OF THE INVENTION

1. Field of the Invention

This invention relates generally to communication systems, and, more particularly, to wireless communication systems.

2. Description of the Related Art

Conventional wireless communication systems typically include one or more devices that provide wireless connectivity over an air interface. Depending upon the type of wireless access technology implemented in the wireless communication system, the devices may include base stations, base station routers, access points, and the like. For example, in a cellular telephone system such as a Universal Mobile Telecommunication System (UMTS) or a Global System for Mobile communication (GSM), base stations may be used to provide wireless connectivity within associated geographic areas or cells. For another example, in a WiFi system or a short-range wireless communication system implemented in accordance with Bluetooth or one of the IEEE standards, an access point may be used to provide wireless connectivity within a hotspot, such as an airport terminal or a coffee shop.

Mobile units may communicate with the base stations over the air interface. Exemplary mobile units may include cellular telephones, personal data assistants, smart phones, paging devices, text messaging devices, global positioning system (GPS) devices, network interface cards, notebook computers, desktop computers, and the like. For example, mobile units may transmit and/or receive messages including voice and/or data information, signaling information, paging messages, broadcast messages, and the like. The base stations are typically communicatively coupled to one or more networks so that the mobile units may communicate with other devices that are also communicatively coupled to the networks. For example, one mobile unit may establish a wireless communication link with another mobile unit via a network coupled to the associated base stations. For another example, mobile units may receive information from a server attached to the network.

Servers attached to the network may transmit information to mobile units using either point-to-point communication techniques or point-to-multipoint communication techniques, which conventionally include multicast and/or broadcast techniques. In point-to-point communication, e.g., from the server to a specific mobile unit, transmitted packets include a packet header that includes information indicative of the mobile unit, such as a media access control (MAC) layer address. The packet may then be transmitted to a base station associated with the mobile unit and the base station may transmit the packet over the air interface. Each packet may be divided up into a number of messages for transmission over the air interface. Each message includes the relevant mobile unit address and a portion of the payload of the original packet. Since the air interface is a shared medium that may carry packets or messages destined for many different mobile units, each mobile unit only "listens" to packets or messages that include the mobile unit's address.

Point-to-multipoint communication permits a server to transmit the same information to more than one mobile unit. For example, users of mobile units may be subscribed to receive a pay-per-view television program provided by a server. The subscribed mobile units may be assigned a multicast or broadcast address for the point-to-multipoint transmission. The server then transmits information to the broadcast/multicast address and the subscribed mobile units "listen" for transmission associated with this address. Thus, the server may multicast the pay-per-view television program to all of the subscribed mobile units by multicasting or broadcasting a stream of packets representative of the pay-per-view television program to the subscribed mobile units using the multicast/broadcast address.

In some cases, multiple streams of packets transmitted to different mobile units by a single base station may be identical. For example, two point-to-point transmissions addressed to two different mobile unit addresses associated with a single base station may contain identical information. For another example, streams of multicast or broadcast data associated with different multicast/broadcast addresses may include identical streams of packets or messages that are being sent to the associated subscribed mobile units. Transmitting duplicate information to mobile units at different addresses may consume an undesirably large portion of the scarce radio transmission resources associated with the air interface, potentially reducing the capacity of the air interface.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for distributing multicast data to mobile units. The method includes providing a plurality of first messages including information indicative of a pseudo-address and a corresponding one of a plurality of mobile unit addresses. The method also includes providing at least one second message including the pseudo-address and a portion of a payload of a packet destined for a plurality of mobile units indicated by the plurality of mobile unit addresses.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
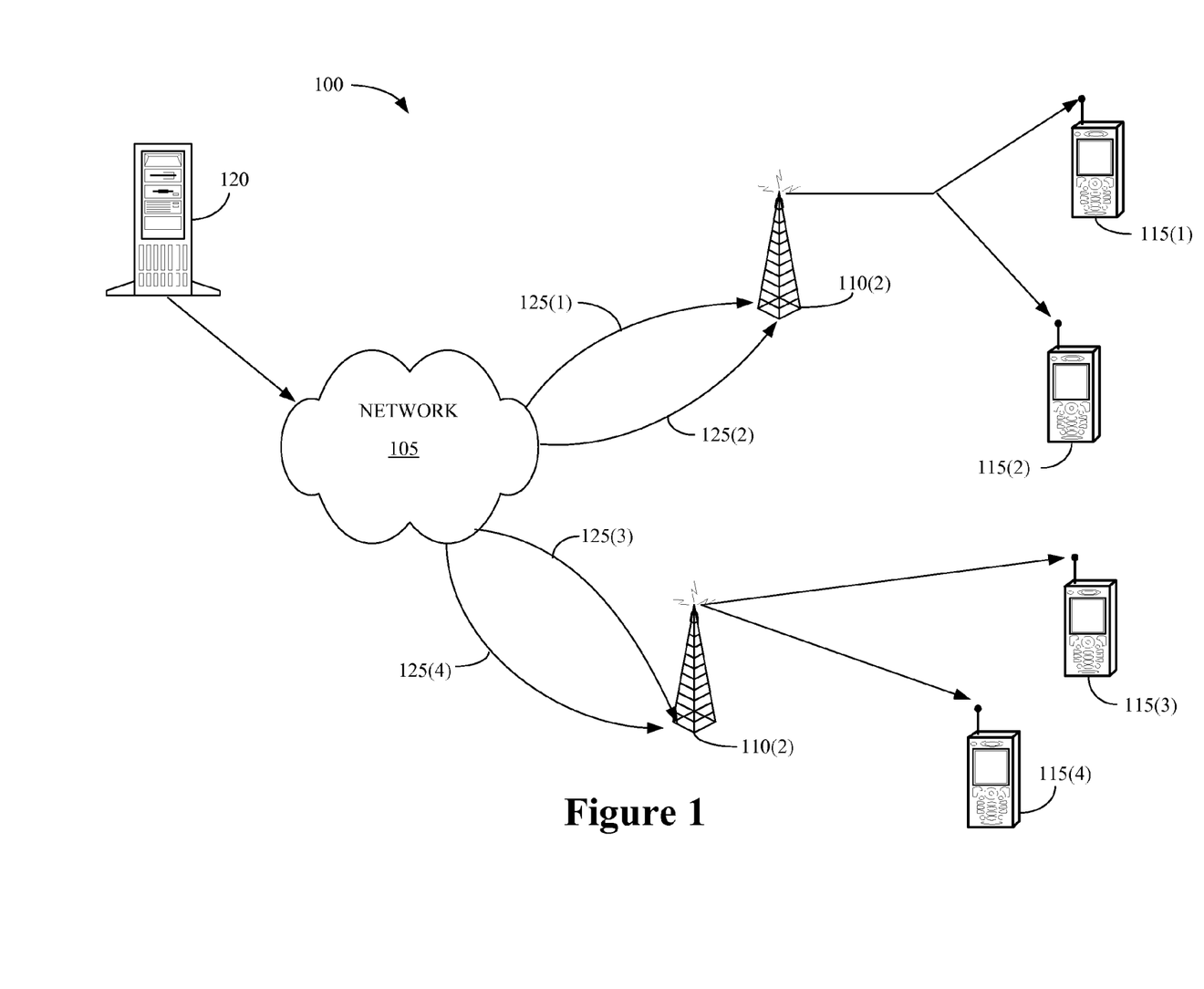
FIG. 1 conceptually illustrates one exemplary embodiment of a wireless communication system, in accordance with the present invention.

FIG. 1 conceptually illustrates one exemplary embodiment of a wireless communication system 100. In the illustrated embodiment, the wireless communication system 100 includes a network 105. The network 105 is used to transmit packets between various destinations and may include wired and/or wireless portions. Accordingly, the network 100 may operate according to the Internet Protocol (IP), as well as various other wired and/or wireless communication standards and/or protocols, such as set forth for the Universal Mobile Telecommunication System (UMTS), the Global System for Mobile communications (GSM), Code Division Multiple Access (CDMA, CDMA 2000), WiFi, Bluetooth, the IEEE 802 standards, the Point-to-Point Protocol (PPP), the User Datagram Protocol (UDP), and the like.

One or more access points 110(1-2) are communicatively coupled to the network 105. The indices (1-2) may be used to indicate individual access points 110(1-2) or subsets thereof. However, the indices (1-2) may be dropped when referring to the access points 110 collectively. This convention may be applied to other elements shown in the drawings and referred to using a number and one or more distinguishing indices. In the illustrated embodiment, the access points 110 provide wireless connectivity according to WiFi standards and/or protocols. However, persons of ordinary skill in the art having benefit of the present disclosure should appreciate that the present invention is not limited to access points 110 that operate according to WiFi standards and/or protocols. In alternative embodiment, any device or combination of devices capable of providing wireless connectivity may be used in place of, or in addition to, the access points 110. For example, base stations, base station routers, and similar devices may alternatively be used to provide wireless connectivity in the wireless communication system 100.

The wireless communication system 100 also includes a plurality of mobile units 115. Exemplary mobile units may include cellular telephones, personal data assistants, smart phones, paging devices, text messaging devices, global positioning system (GPS) devices, network interface cards, notebook computers, desktop computers, and the like. Although FIG. 1 shows four mobile units 115, persons of ordinary skill in the art having benefit of the present disclosure should appreciate that the wireless communication system 100 may provide wireless connectivity to any number of mobile units 115. In one embodiment, the mobile units 115 may establish wireless communication links with one or more of the base stations 110. For example, the mobile units 115(1) and 115(4) may establish a point-to-point connection via the base stations 110 and the network 105 so that users of the mobile units 115(1) and 115(4) may communicate, e.g., the users may have a conversation. The mobile units 115 may also receive point-to-multipoint, or multicast, transmissions via one or more of the base stations 110.

In the illustrated embodiment, the wireless communication system 100 includes a server 120 that is configured to provide streams of substantially identical information to one or more of the mobile units 115. As used herein, the term "substantially" is meant to indicate that the information in the multiple streams is intended to convey the same content at approximately the same time, within a selected tolerance. However, persons of ordinary skill in the art having benefit of the present disclosure should appreciate that the information (or the representation of the information) in each stream may not be precisely identical and may not be provided at precisely the same time. The differences may be intentional, e.g., when different service levels are provided, or unintentional, e.g., due to interference, travel time differences, and the like. For example, the users of the mobile units 115 shown in FIG. 1 may have subscribed to one or more multicast services, such as IPTV or a pay-per-view service, provided by the server 120. Accordingly, the server 120 may provide multiple streams 125 of multicast data to the appropriate base stations 110 via the network 105. The base stations 110 may then transmit the information included in the multiple streams 125 to one or more of the mobile units 115 over the air interface.

Each of the multiple streams 125 transmits packets addressed to one of the subscribed mobile units 115. Headers of the packets included in the multiple streams 125 may therefore include destination addresses of the associated subscribed mobile unit 115, as will be discussed in detail below. Payloads of the packets transmitted in the multiple streams 125 may include substantially the same information and may be transmitted substantially simultaneously. As used herein, the term "substantially" is meant to indicate that the packets in the multiple streams 125 convey information indicative of the same content at approximately the same time, within a selected tolerance. However, persons of ordinary skill in the art having benefit of the present disclosure should appreciate that the transmitted and/or received packets in each stream 125 may not be precisely identical and may not arrive at the mobile units 115 at precisely the same time. The differences may be intentional, e.g., when the mobile units 115 subscribe to different service levels, or unintentional, e.g., due to interference, travel time differences, and the like.

In the illustrated embodiment, the base station 110(2) receives data from the multicast streams 125(3-4), which is destined for the mobile units 115(3-4), respectively. The multicast streams 125(3-4) include streams of IP packets, which may be segmented into smaller messages before being transmitted over the air interface. The base station 110(2) may determine whether the packets in the streams 125(3-4) include substantially identical information and/or whether the identical packets have arrived within a specified tolerance time or delay, as will be discussed in detail below. If the base station 110(2) determines that the packets in the streams 125(3-4) are not substantially identical information, or that the identical packets have not arrived substantially simultaneously, and the base station 110(2) may fragment the packets into independent sets of messages and transmit both sets of messages over the air interface.

Figure 2:
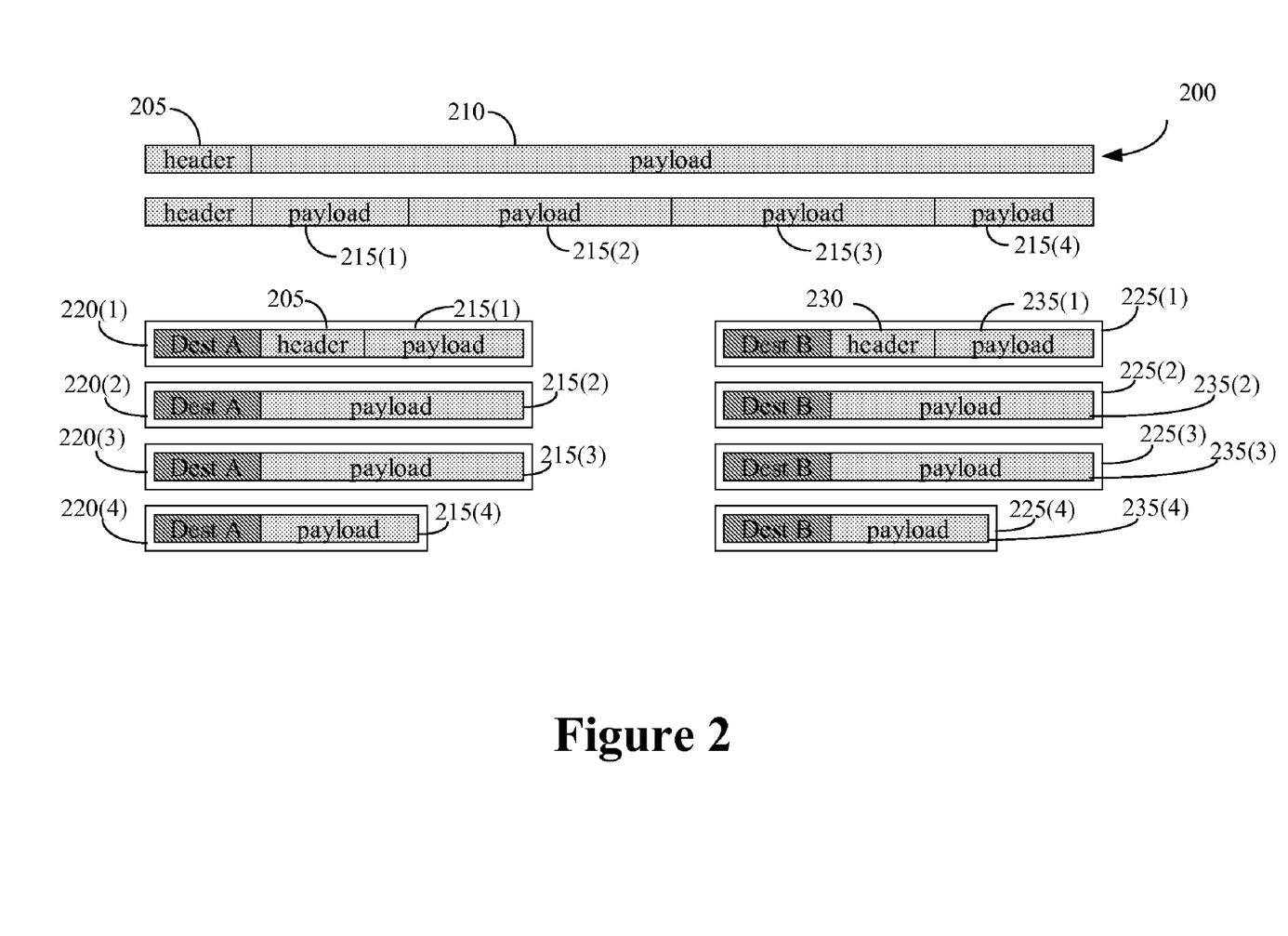
FIG. 2 conceptually illustrates a first exemplary embodiment of a technique for fragmenting a packet, in accordance with the present invention.

FIG. 2 conceptually illustrates a first exemplary embodiment of a technique for fragmenting a packet 200. In the illustrated embodiment, the packet 200 is an IP packet that includes a header 205 and a payload 210. The packet 200 may be fragmented by dividing the payload 210 into portions 215. Although four portions 215 are shown in FIG. 2, persons of ordinary skill in the art having benefit of the present disclosure should appreciate that any number of portions 215 may be used. In various alternative embodiments, the number of portions 215 may be influenced by considerations such as the size of the payload 210, characteristics and/or capabilities of the transmitting device, the air interface, and/or the receiving device, and the like.

The portions 215 may then be incorporated into a plurality of messages 220 destined for a subscribing mobile unit, such as the mobile unit 115(3) shown in FIG. 1. In the illustrated embodiment, the first message 220(1) includes information identifying the destination mobile unit (Dest A), such as a MAC address, the header 205 and the first portion 215(1). The remaining messages 220(2-4) include the information identifying the destination mobile unit (Dest A) and the portions 215(2-4), respectively. The messages 220 may then be transmitted over the air interface and received by the destination mobile unit, which determines that it should "listen" to the messages 220 based on the information identifying the destination mobile unit (Dest A) that is included in each message 220.

Packets (not shown) from other streams that do not include substantially identical information or are not received within the specified tolerance time may be used to form additional messages 225. The additional messages 225(1) include information identifying the other destination mobile unit (Dest B), such as a MAC address, a header 230 and a first portion 235(1) of the packet from the other streams. The messages 225(2-4) include the information identifying the destination mobile unit (Dest B) and remaining portions 215(2-4) of the packet, respectively. The messages 225 may then be transmitted over the air interface and received by the destination mobile unit, which determines that it should "listen" to the messages 225 based on the information identifying the destination mobile unit (Dest B) that is included in each message 225.

Referring back to FIG. 1, the base station 110(1) receives data from the multicast streams 125(1-2), which is destined for the mobile units 115(1-2), respectively. The multicast streams 125(1-2) include streams of IP packets, which may be segmented into smaller messages before being transmitted over the air interface. The base station 110(1) may determine whether the packets in the streams 125(1-2) include substantially identical information and/or whether the identical packets have arrived within a specified tolerance time, as will be discussed in detail below. If the base station 110(1) determines that the packets in the streams 125(1-2) contain substantially identical information and that the identical packets have arrived within an acceptable tolerance time, the base station 110(1) may fragment one of the identical packets into portions that may be transmitted in a manner that allows the subscribed mobile units 115(1-2) to receive, or "listen" to, the same messages including information in some or all of the portions.

Figure 3:
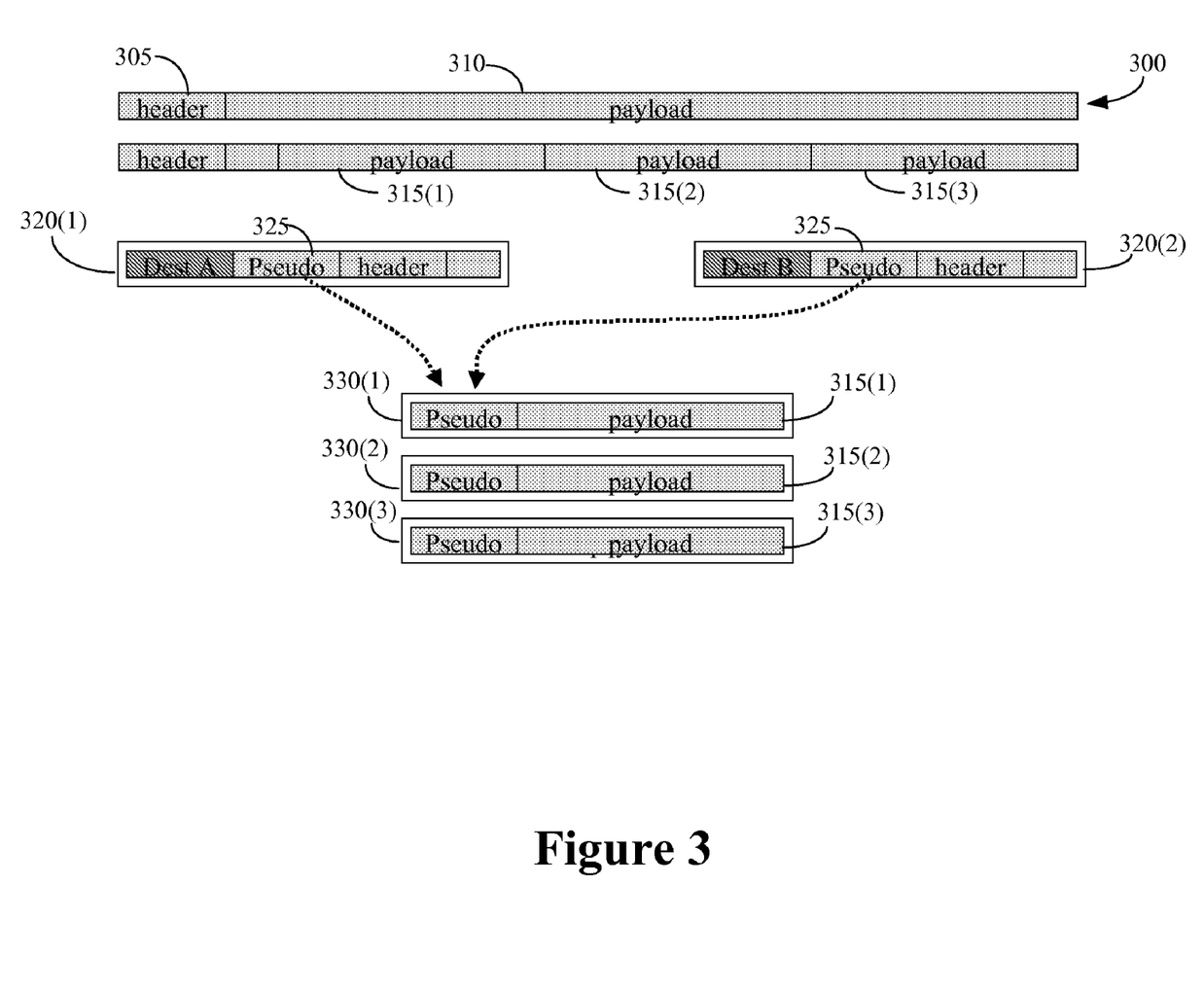
FIG. 3 conceptually illustrates a second exemplary embodiment of a technique for fragmenting a packet, in accordance with the present invention.

FIG. 3 conceptually illustrates a second exemplary embodiment of a technique for fragmenting a packet 300. In the illustrated embodiment, the packet 300 is an IP packet that includes a header 305 and a payload 310. The packet 300 is one of a plurality of substantially identical packets that have been received by an access point as part of multiple streams of data that are destined for multiple mobile units. In one embodiment, the substantially identical packets are part of one or more multicast or broadcast streams. Alternatively, the substantially identical packets may be included in multiple unicast (point-to-point) data streams that either intentionally or coincidentally contain substantially identical information. The packet 300 may be fragmented by dividing the payload 310 into portions 315. Although four portions 315 are shown in FIG. 3, persons of ordinary skill in the art having benefit of the present disclosure should appreciate that any number of portions 315 may be used. In various alternative embodiments, the number of portions 315 may be influenced by considerations such as the size of the payload 310, characteristics and/or capabilities of the transmitting device, the air interface, and/or the receiving device, and the like.

Multiple messages 320 may be formed using portions of the packet 300. Each of the messages 320 are destined for different mobile units and so the messages 320 include information indicative of the destination mobile units (Dest A, Dest B). The messages 320 may also include the header 305 and, in some embodiments, a portion of the payload 310, although this is not depicted in FIG. 3. The messages 320 also include information, referred to hereinafter as a pseudo-address 325, which allows the subscribed mobile units to determine that subsequent messages 330 are destined for the mobile units. In one embodiment, the pseudo-address 325 includes information that is different and distinct from the individual mobile unit addresses indicated in the packets 300. However, in alternative embodiments, any information may be used to form the pseudo-address 325 such that more than one mobile unit may access information in the messages 330.

The messages 320, 330 may be transmitted over the air interface to the subscribed mobile units. Each of the destination mobile units indicated in the messages 320 may receive the corresponding message 320 and use the included information to determine the pseudo-address 325. The destination mobile units may then receive the messages 330 using the pseudo-address 325. Consequently, some or all of the payload 310 in the packet 300, which is one of a plurality of identical packets, may be transmitted to more than one destination mobile unit using a single group of messages 330 destined for all the mobile units.

Figure 4:
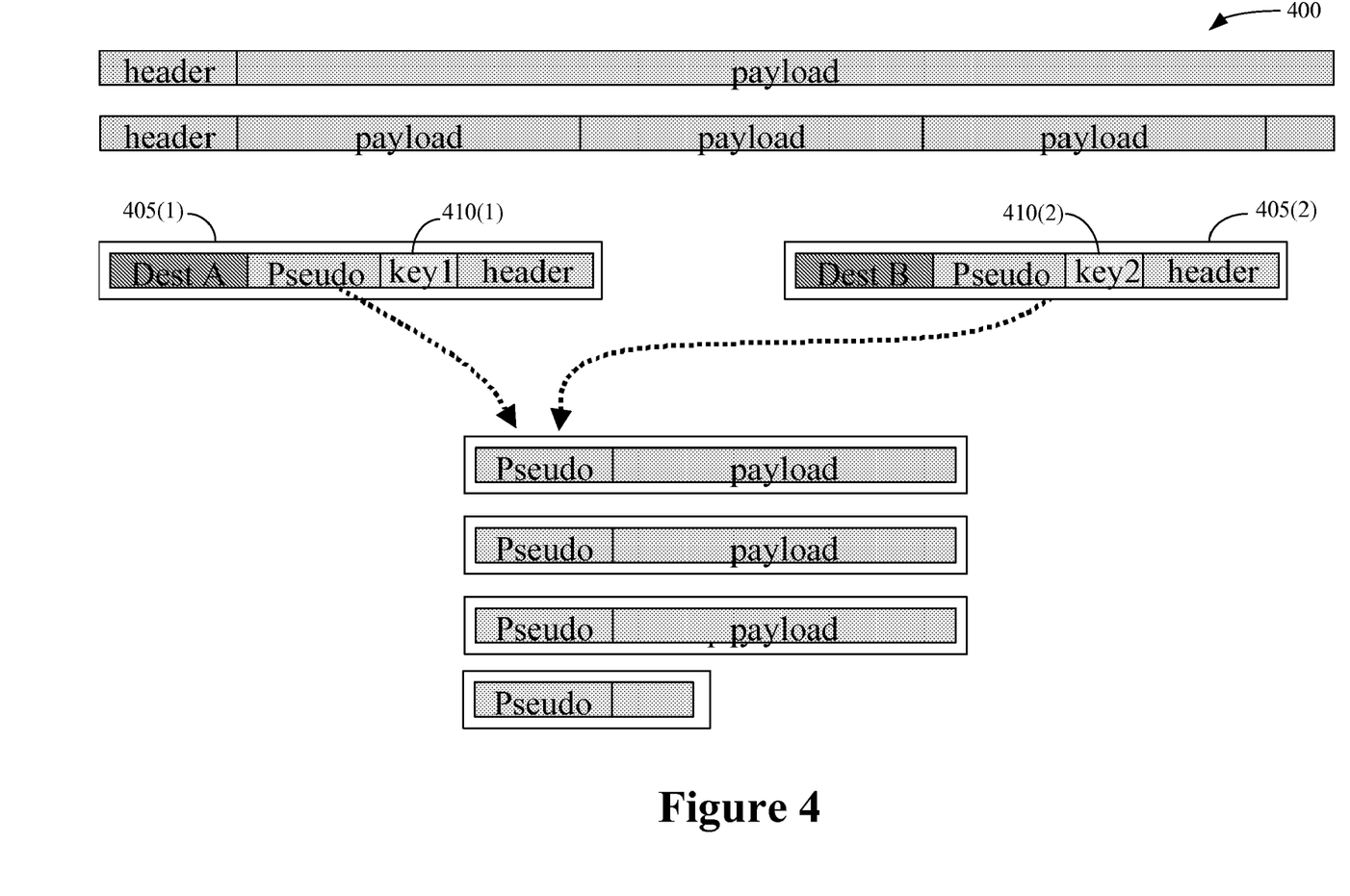
FIG. 4 conceptually illustrates a third exemplary embodiment of a technique for fragmenting a packet, in accordance with the present invention.

FIG. 4 conceptually illustrates a third exemplary embodiment of a technique for fragmenting a packet 400. The third exemplary embodiment is similar to the second exemplary embodiment shown in FIG. 3. However, the third exemplary embodiment differs from the second exemplary embodiment in that the initial messages 405 that are transmitted separately to the different destination mobile units also include one or more security keys 410, which may be used to encrypt and/or decrypt information transmitted in the messages 415. Accordingly, the third exemplary embodiment may provide additional security for transmissions over the air interface.

Figure 5:
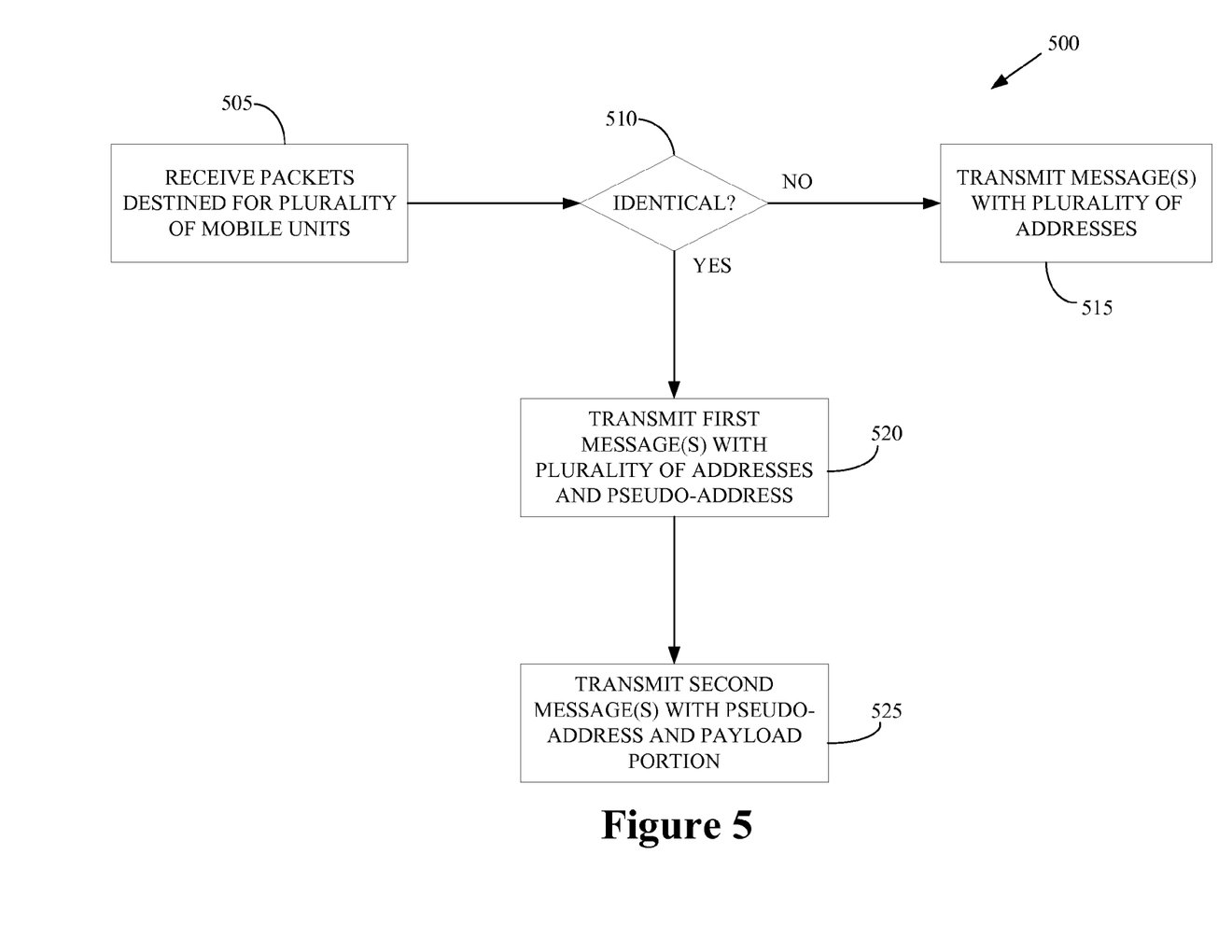
FIG. 5 conceptually illustrates one exemplary embodiment of a method of distributing identical data to mobile units, in accordance with the present invention.

FIG. 5 conceptually illustrates one exemplary embodiment of a method 500 of distributing substantially identical data to mobile units. In the illustrated embodiment, packets from multiple streams of data are received (at 505), e.g., at an access point, a base station, or a base station router. The packets may then be analyzed to determine (at 510) whether two or more of the packets contain substantially identical information. In one embodiment, the contents of the packets may be compared to determine (at 510) whether packets contain substantially identical information. For example, an access point may randomly select packets from different data streams and compare (at 510) the packets to determine whether the packets are substantially identical. Alternatively, a tag or a token may be incorporated into packets in multiple streams to indicate that the streams include substantially identical information. In that case, the packets may be examined for the presence of these tags and/or tokens.

In one embodiment, other information associated with the packets may be analyzed to determine (at 510) whether packets contain substantially identical information within a reasonable probability. For example, source addresses, destination ports, and error-checking bits (such as cyclic redundancy check bits) may be compared. If these addresses, ports, and error bits are the same for a packet, then it is very likely that these packets include substantially identical information. This embodiment may advantageously be able to determine (at 510) whether packets contain substantially identical information (at least within an acceptable probability) by comparing a smaller portion of the information included in the packets, thereby conserving scarce computation resources, e.g., at the access point, base station, base station router, or other entity.

In one embodiment, arrival times of the packets may also be analyzed (at 510) to determine whether the packets have arrived, or should be transmitted, within a specified time. For example, the arrival and/or transmission of packets may be required to satisfy certain delay constraints. Accordingly, if identical packets have arrived, are expected to arrive, and/or need to be transmitted at times that satisfy these delay constraints, then these packets may be determined (at 510) to be substantially identical. However, if the packets may not satisfy the delay constraints when they are delayed so that they may be fragmented and transmitted in a single set of messages indicated by a pseudo-address as discussed above, then these packets may not be determined (at 510) to be substantially identical.

Packets associated with different streams that are not determined to be identical may be fragmented into different sets of messages, which may be independently transmitted (at 515) to the appropriate mobile unit, as discussed above. However, if two or more of the packets are determined to be substantially identical, then one of the packets may be fragmented into messages that include a plurality of first messages that are destined to a corresponding plurality of mobile units. Each of the plurality of first messages includes a pseudo-address. The packets may also be fragmented into one or more second messages that include the pseudo-address and portions of the packet payload, as discussed above. The first messages may be transmitted (at 520) to the plurality of mobile units, which may access the pseudo-address in these messages. The second messages may then be transmitted (at 525) to the plurality of mobile units, which may access these messages, and the payload portions, using the pseudo-address.

Fragmenting identical packets into a single set of messages indicated by a pseudo-address that allows multiple mobile units to access the information in these messages may reduce or eliminate the redundant transmission of identical information, particularly when multiple identical streams of data are transmitted to a plurality of mobile units served by the same base station. By removing or reducing the redundant transmission of payloads from identical packets in multiple streams, the capacity of the air interface may be increased and scarce radio resources may be conserved.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:
1. A method, comprising:
  receiving a plurality of substantially identical packets, each of the substantially identical packets being addressed to one of a plurality of mobile units by a corresponding mobile unit address;

providing a plurality of first messages including information indicative of a pseudo-address, each first message being addressed to one of the plurality of mobile units using the corresponding mobile unit address and each packet containing a first portion of one of the plurality of substantially identical packets; and providing at least one second message addressed to the plurality of mobile units using the pseudo-address, said at least one second message including at least one second portion of said one of the plurality of substantially identical packets.

2. The method of claim 1, wherein providing the plurality of first messages comprises providing the plurality of first messages in response to receiving the plurality of substantially identical packets addressed to the plurality of mobile units.

3. The method of claim 1, wherein providing said at least one second message comprises providing a plurality of second messages such that the payloads of the plurality of second messages include information indicative of the entire payload of said one of the plurality of substantially identical packets.

4. The method of claim 1, wherein providing the plurality of first messages comprises providing the plurality of first messages including a plurality of security keys.

5. The method of claim 1, wherein providing the plurality of first messages comprises providing the plurality of first messages at a plurality of first transmission rates.

6. The method of claim 5, wherein providing said at least one second message comprises providing said at least one second message at a second transmission rate.

7. A method, comprising:

receiving a plurality of packets destined for the plurality of mobile units;

determining that the plurality of packets are substantially identical;

providing a plurality of first messages including information indicative of a pseudo-address, each first message including information indicative of a corresponding one of a plurality of mobile unit addresses and being provided in response to receiving the plurality of substantially identical packets destined for the plurality of mobile units;

providing at least one second message including the pseudo-address and a portion of a packet destined for a plurality of mobile units indicated by the plurality of mobile unit addresses.

8. The method of claim 7, wherein determining that the plurality of packets are substantially identical comprises at least one of comparing the plurality of packets, accessing a plurality of tags included in the plurality of packets, and comparing source addresses, destination ports, and error checking bits associated with the plurality of packets.

9. The method of claim 7, comprising determining a time difference between the substantially identical packets, and wherein providing the plurality of first messages comprises providing the plurality of first messages in response to determining that the time difference is within a selected tolerance.

10. A method, comprising:

receiving, at a first mobile unit, a first message including information indicative of a pseudo-address and a first mobile unit address, the first message also including a first portion of one of a plurality of substantially identical packets addressed to the first mobile unit using the first mobile unit address, at least one of the plurality of substantially identical packets being addressed to at least one second mobile unit using a second mobile unit address; and receiving, at the first mobile unit, at least one second message addressed to the first mobile unit using the pseudo-address, said at least one second message including a second portion of said one of the plurality of substantially identical packets.

11. The method of claim 10, wherein receiving the first message comprises receiving the first message in response to detection of the plurality of substantially identical packets addressed to the first mobile unit and said at least one second mobile unit.

12. The method of claim 10, wherein receiving said at least one second message comprises receiving a plurality of second messages such that the payloads of the plurality of second messages include information indicative of the entire payload of said one of the plurality of substantially identical packets.

13. The method of claim 10, wherein receiving the first message comprises receiving at least one security key.

14. The method of claim 13, where receiving said at least one security key comprises receiving at least one security key for at least one of authentication and decryption of said at least one second message.

15. The method of claim 10, wherein receiving the first message comprises receiving the first message at one of a plurality of first transmission rates.

16. The method of claim 15, wherein receiving said at least one second message comprises receiving said at least one second message at a second transmission rate.

17. A method, comprising:

receiving one of a plurality of first messages including information indicative of a pseudo-address and a corresponding one of a plurality of mobile unit addresses, wherein receiving the first message comprises receiving the first message in response to determining that a time difference between the substantially identical packets is within a selected tolerance; and receiving at least one second message including the pseudo-address and a portion of payload of a packet.

* * * * *

UNITED STATES PATENT AND TRADEMARK OFFICE
CERTIFICATE OF CORRECTION

| | |
|---|---|
| PATENT NO. | : 7,653,019 B2 |
| APPLICATION NO. | : 11/461054 |
| DATED | : January 26, 2010 |
| INVENTOR(S) | : Gaast et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 558 days.

Signed and Sealed this

Twenty-eighth Day of December, 2010

David J. Kappos
*Director of the United States Patent and Trademark Office*